United States Patent [19]

McGhie et al.

[11] Patent Number: 4,468,047

[45] Date of Patent: Aug. 28, 1984

[54] STEERING ASSEMBLY FOR TOWED VEHICLES

[75] Inventors: James R. McGhie, Brampton; Semyon I. Fishgal, Toronto, both of Canada

[73] Assignee: American Hoist of Canada Limited, Brampton, Canada

[21] Appl. No.: 378,611

[22] Filed: May 17, 1982

[51] Int. Cl.³ .............................................. B62D 13/02
[52] U.S. Cl. ..................................... 280/419; 180/136; 280/442
[58] Field of Search .................. 180/134, 135, 136; 280/442, 443, 439, 489, 426

[56] References Cited

U.S. PATENT DOCUMENTS

| 2,959,428 | 11/1960 | Felburn | 280/426 |
| 3,014,739 | 12/1961 | Kress | 280/489 X |
| 3,591,203 | 7/1971 | Steiner | 280/426 |

FOREIGN PATENT DOCUMENTS

| 54-3734 | 1/1979 | Japan | 180/135 |
| 270515 | 5/1970 | U.S.S.R. | 280/442 |

Primary Examiner—John A. Pekar
Attorney, Agent, or Firm—Stanley E. Johnson; Richard J. Hicks

[57] ABSTRACT

A towable wheeled undercarriage for carrying and supporting heavy loads and more particularly a carriage for supporting a crane of heavy duty or high capacity type. The carriage or carrier has a plurality of front and rear wheeled units independently mounted on a structural frame extending longitudinally of the vehicle and with at least the front wheels thereof being steerable. A gooseneck extends forwardly from the carrier and a coupling means on the forward end thereof connects to the fifth wheel of a tractor or towing vehicle. The coupling includes cushion means to support variable loads imposed by the fifth wheel on the gooseneck during towing and a linkage assembly is provided which is controlled by the fifth wheel to steer the front steerable wheels.

6 Claims, 5 Drawing Figures

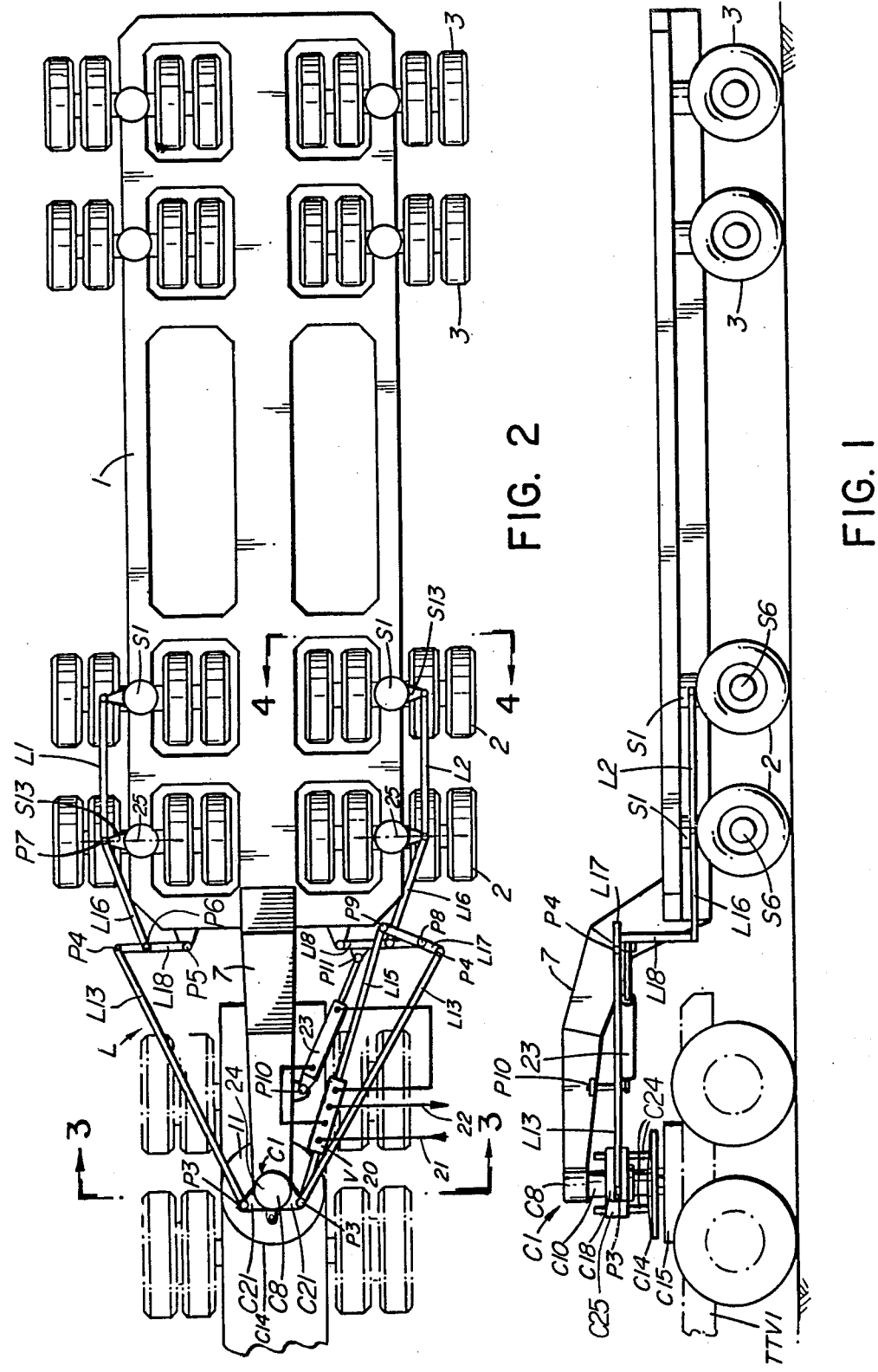

STEERING ASSEMBLY FOR TOWED VEHICLES

FIELD OF INVENTION

This invention relates to a steerable towed vehicle intended primarily for carrying and supporting heavy loads and more particularly to a linkage arrangement for steering the steerable wheels by the towing vehicle.

The vehicle of the present invention, while intended primarily as a support and means for moving a crane from one place to another over highways as well as untavelled terrain may be used to carry any load. The description to follow is directed to a wheeled undercarriage for high capacity cranes, for example, a hundred ton type crane, but it is to be understood the present invention is not limited thereto as it is applicable to any steerable towed vehicle where the steerable wheels are steered by the towing vehicle.

DISCUSSION OF PRIOR ART

Towed vehicles having steerable wheels steered by the towing vehicle are known and as examples of the same reference may be had to the following U.S. Pat. Nos.:

2,819,911
2,925,285
2,959,428
3,195,922
3,448,999
3,533,644
3,689,107
3,690,698
3,712,641
3,734,538
3,930,669
4,244,596.

The steering systems in the foregoing references are mainly mechanical and are considered to provide relatively imprecise steering which is dangerous at high speeds. The foregoing towed vehicles are not intended for carrying heavy loads on the steerable wheels and therefore do not require power assistance for steering.

Hydraulically operated steering assemblies for towed vehicles are known as exemplified by the following U.S. Pat. Nos.:

2,968,495
3,322,698
4,010,816.

The latter steering systems do not have non-interrupted mechanical linkages between the fifth wheel and the steerable wheel assemblies. They rely only on hydraulic power and are therefore limited to relatively slow speed towing.

A principal object of the present invention is to provide a mechanical linkage for precise controlled steering of steerable wheels on a towed vehicle.

A further object of the present invention is to provide a power assisted mechanical steering system for steering steerable wheels on a towed vehicle via the fifth wheel on the towing vehicle.

High capacity mobile cranes are extremely heavy pieces of equipment and thus require numerous wheels for supporting the same. In moving from one site to another they must be capable of travelling on highways at relatively high speeds and thus require precise steering control for the trailer carrying the crane.

SUMMARY OF INVENTION

The applicants wheeled undercarriage or trailer is adapted to be towed by a tractor towing unit and is coupled thereto by a fifth wheel arrangement which transfers via a cushion support some of the weight of the towed vehicle to the towing vehicle. The cushion support and fifth wheel of the towing vehicle via a linkage system steer steerable wheel units on the towed vehicle.

In keeping with the foregoing there is provided in accordance with the present invention a trailer adapted to be towed by a towing vehicle comprising:

(a) a frame supported upon a plurality of front and rear wheel units and wherein said front wheels are steerable;

(b) a gooseneck extending forwardly from the frame and having on the leading end thereof coupling means for connecting to the fifth wheel of a tractor towing vehicle; and (c) linkage means controlled by the fifth wheel of the towing vehicle to steer the front steerable wheels of the carrier, said linkage means comprising a first pair of links connected at one end thereof for movement by the fifth wheel of the towing vehicle during turning thereof, and at the other end to respective ones of a first pair of lever arms pivotally connected to the frame of the trailer, a second pair of links connected at one end to respective ones of said first pair of lever arms and at the other end to second arm means connected to the front steerable wheels to steer the same and power means to assist in steering the steerable wheels.

In the preferred embodiment the coupling means on the gooseneck comprises a fluid pressure cylinder mounted on said gooseneck adjacent the free outer end thereof and having a plunger reciprocally mounted therein, said plunger projecting downwardly from said gooseneck and having a plate with a king pin secured thereto for coupling with the saddle of a conventional fifth wheel of a tractor towing vehicle, said cylinder and plunger acting in conjunction with a compressible medium to cushion loads between said gooseneck and the towing vehicle.

BRIEF DESCRIPTION OF THE DRAWINGS

The invention is illustrated by way of example with reference to the accompanying drawings wherein:

FIG. 1 is a side elevational view of a towable carrier having steerable front wheels steered by linkage means provided in accordance with the present invention;

FIG. 2 is a top plan view of FIG. 1;

DESCRIPTION OF PREFERRED EMBODIMENT

Figure 3:
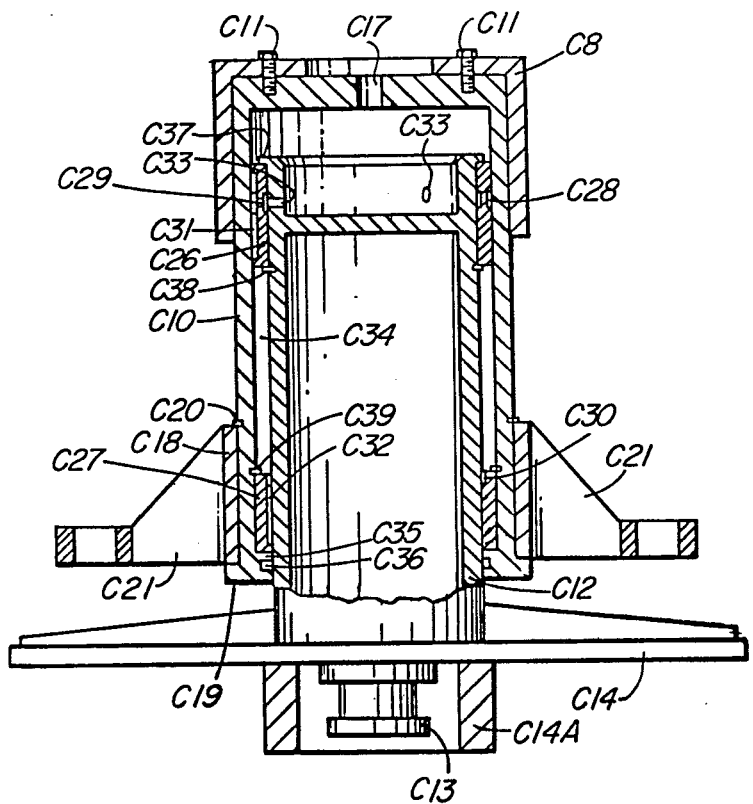
FIG. 3 is a sectional view taken along line 3—3 of FIG. 2.

Referring to the drawings there is illustrated in FIGS. 1 and 2 a towable wheeled carrier or trailer having a rigid frame 1 supported on front and rear independently mounted ground-engaging wheel assemblies 2 and 3 respectively (eight such assemblies being illustrated in FIG. 2) and a gooseneck 7 secured to the frame and projecting forwardly therefrom. A fifth wheel coupling unit C1 includes a fluid pressure suspension cylinder secured to the gooseneck adjacent the free outer end thereof with a plunger reciprocally mounted therein and projecting downwardly therefrom. A plate with a king pin is secured to the plunger for coupling with the saddle of a fifth wheel on a towing vehicle. The plunger in the cylinder acts in conjunction with a compressible medium to cushion loads between said gooseneck and towing vehicle. The fifth wheel, by way of linkages, to be described hereinafter, via a collar rotatably mounted on the cylinder, steers steerable wheels on the towed vehicle.

The plurality of independent wheel units 2 and 3 are mounted on the frame by suspension assemblies S1. The suspension assemblies for at least the front wheels provide pivot means for use in steering as will become more apparent hereinafter. The suspension assemblies per se are the subject of applicants' U.S. application Ser. No. 378,613 filed May 17, 1982, the subject matter of which is incorporated herein by reference thereto.

Figure 4:
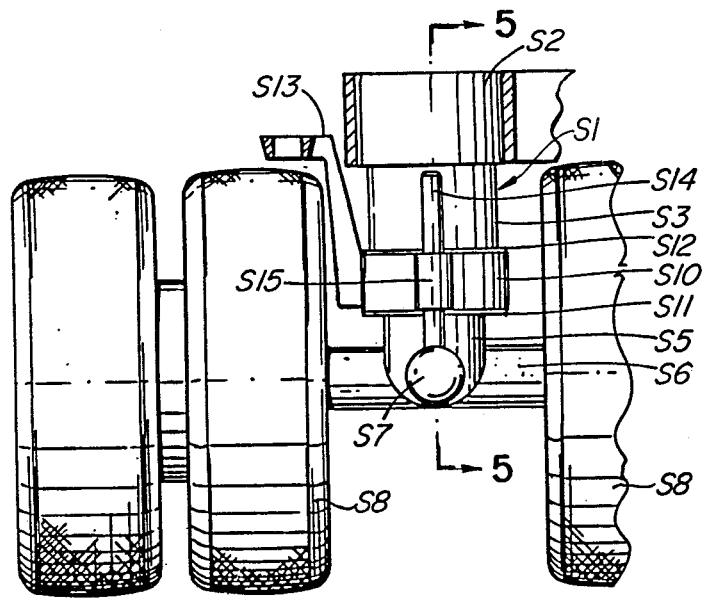
FIG. 4 is a partial rear elevational view of a steerable wheel unit taken essentially along line 4—4 of FIG. 2.
Figure 5:
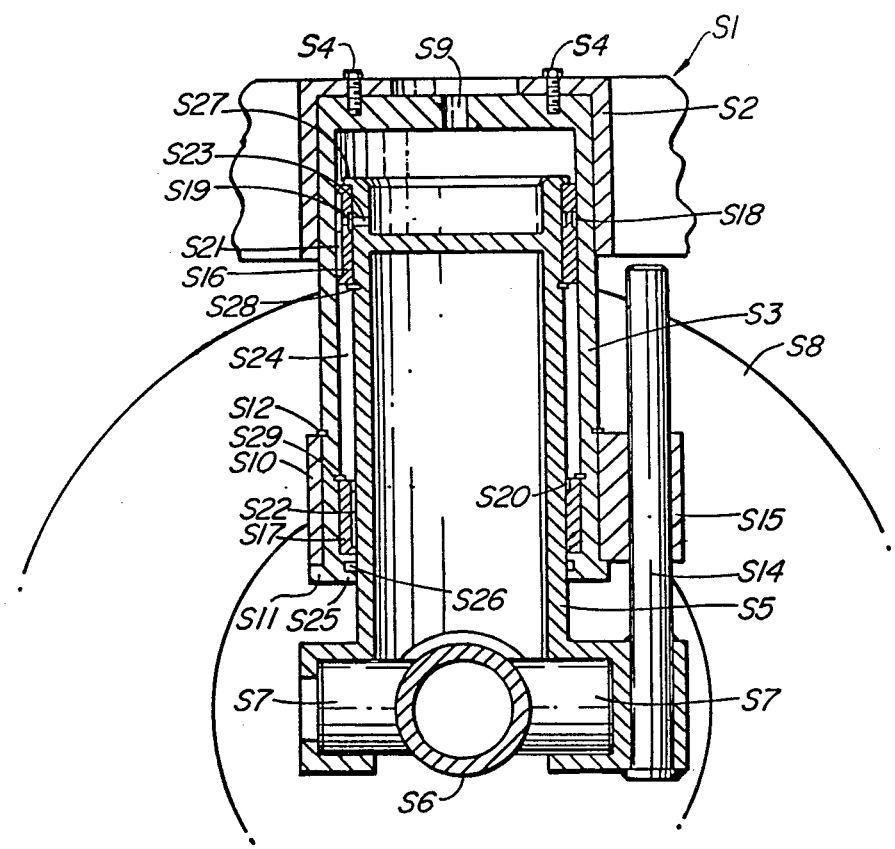
FIG. 5 is a sectional view taken along line 5—5 of FIG. 4.

Referring to FIGS. 4 and 5 each suspension assembly S1 has a pressure cylinder S3 mounted on frame 1 by a socket S2 fixed detachably or permanently by conventional fastening means. Cylinder S3 for example, may be welded to the socket S2 or secured thereto by means of studs passing through the base plate of the socket and threaded into the end wall of the cylinder, the centerline of two such studs being indicated at S4.

The cylinder S3 has a plunger S5 reciprocally mounted therein, plunger S5 being freely rotatable (for the steerable front wheel units) with respect to the longitudinal axis of the cylinder and having on the lower end means for attaching thereto the axle of a wheel assembly. Each wheel unit includes two sets of dual wheels S8 journalled for rotation in a conventional manner on a common axle S6. A bearing shaft secured to axle S6 and transverse thereto has bearing ends S7 journalled in suitable bearing means located adjacent the lower end of the plunger. Axle S6 accordingly, is permitted to oscillate about an axis which is perpendicular to the length of the plunger and in line with the direction of travel of the wheels.

For cushioning the wheel assemblies, plunger S5 acts against a compressible fluid contained in the cylinder S3 or alternatively, a hydraulic fluid connected to a variable fluid pressure source; for example, a hydraulic accumulator. When using hydraulic fluid the cylinder S3 is connected to a fluid pressure source, for example a hydraulic accumulator (not shown) by means of an outlet S9 in the end of the cylinder.

A jacket or collar S10 is rotatably mounted on the outer surface of cylinder S3 adjacent the lower end thereof. The collar S10 is located between a flange S11 projecting outwardly from the cylinder and a retaining ring S12, flange S11 and ring S12 preventing movement of the collar S10 axially along the cylinder. Collar S10 (for the steerable wheel units) is provided with an arm S13 actuated by a vehicle steering system to be described in detail hereinafter.

For the steerable wheel units, collar S10, cylinder S3 and plunger S5 are concentrically disposed about a common axis and means are provided interconnecting the collar and plunger to rotate in unison about said common axis and at the same time permit movement of one relative to the other along said axis. The means interconnecting the jacket S10 and plunger S5 is referred to herein as an expansion collar. One form of expansion coupling is illustrated in FIGS. 4 and 5 and consists of at least one rod S14 secured to the plunger S5 and slidable in an aperture in the collar. The rod extends parallel to the plunger in spaced relation thereto and projects upwardly from the lower end of the plunger through a sleeve S15 fixedly secured to the jacket S10. Obviously the collar S10 may be provided with an enlargement having a bore extending therethrough replacing the separate sleeve element S15. The rod S14 in this embodiment couples the collar with the plunger so as to rotate in unison about their common axis while at the same time provides a longitudinal slide way allowing movement of one relative to the other along the common axis. The slide way is also adapted to accept side loads.

In FIG. 5, by way of illustration but not in a limiting sense, the cylinder S3 is shown pistonless guided by way of radial bushings S16 and S17 respectively on the plunger and in the cylinder in spaced apart relation. The bushings are provided with oil grooves S18, S19 and S20 around the peripheral surface and axial channels S21 and S22, which are supplied with a working hydraulic fluid from the cylinder by way of openings S23 in a recessed upper end portion of the plunger and a cavity S24 between the plunger and the cylinder. The plunger is sealed in the cylinder cover S25 by means of a conventional seal S26. The bushings S16 and S17 provide a hydrostatic cushion to withstand side loads on the plunger S5. The bushing S16 abuts against a flange S27 on the upper end of the plunger and is retained on the plunger by a fastener S28 abutting against an opposite end of the bushing. Similarly, seal S17 is retained within the cylinder S3 by the end cap S25 and a retaining ring means S29.

As an alternative to the foregoing seal arrangement, bushings S16 and S17 can be replaced by a single bearing between the plunger and the cylinder extending along considerable length of the plunger from the lower end of the cylinder toward the upper closed end. Hydraulic fluid in the cylinder is located not only at the end of the plunger but also therearound above seal S26, such an arrangement being referred to as a pistonless hydraulic device.

For the non-steerable wheel units collar S10 is fixedly secured to the cylinder S3. The steerable wheels are steered by the fifth wheel coupling C1 (described hereinafter) by a linkage system L connected by suitable tie rod ends to arms S13 projecting from collar S10 of the suspension assemblies S1.

The fifth wheel coupling C1 is shown in detail in FIG. 3 from which it will be apparent the construction thereof is essentially the same as each suspension assembly S1.

Referring now to the FIG. 3, the coupling C1 includes a housing C8 in the form of a cap having an open lower end. The cap is rigidly secured to the free end of the gooseneck as by welding or any other suitable means. A fluid pressure cylinder C10 projects into the housing and extends downwardly therefrom. The cylinder is fixed to the housing by conventional fasteners as at C11 and/or by welding or any other suitable means. The cylinder C10 has a plunger C12 reciprocally mounted therein and projecting downwardly therefrom. A plate C14 is rigidly secured to the lower free end of the plunger and a king pin C13 projects downwardly from the lower face of the plate. The plate and king pin couples the towed vehicle to the saddle of a fifth wheel on the towing vehicle in a conventional manner. A tapered block or wedge C14A on the lower surface of the plate projects into the notch of a conventional fifth wheel 15 of the tractor towing vehicle TTV1. Block 14A prevents plate C14 from rotating when sitting on the saddle of the fifth wheel. The cylinder C10 is connected to a fluid pressure source (eg. a hydraulic accumulator not shown) by means of an outlet C17.

On the outer peripheral surface of the cylinder C10 there is rotatably mounted a collar C18 which is retained in position by a flange C19 and conventional C clip C20. The collar C18 has a pair of arms C21 projecting outwardly therefrom which are connected to the arms S13 of the front wheel assemblies by means of links L13, L18 and L16 on one side and L13, L15, L17, L18 and L16 on the other side. The collar C18, cylinder C10 and plunger C12 are arranged concentrically on a common axis with the plunger and collar being rotatable about such axis. The collar C18 is connected by suitable coupling means with the plunger C12 causing the same to rotate in unison about said common axis while at the same time allowing reciprocal movement of the plunger in the cylinder. The coupling means illustrated in FIGS. 1, 2 and 3 consist of at least one upright rod C24 fixed to the plate C14 and sliding within a sleeve C25 rigidly secured to the collar C18. The rods C24 serve both as the coupling and as a longitudinal slideway to accept side loads.

Also, in FIG. 3 by way of illustration, but not in a limiting sense, the cylinder C10 is shown pistonless with radial bushings C26 and C27 provided with oil circular grooves C28, C29, C30 and axial channels C31, C32 supplied with a working hydraulic fluid via openings C33 in the plunger C12 and from a cavity C34. The plunger is sealed in a cylinder cover C35 by means of a conventional seal C36.

The bushings C26 and C27 form hydrostatic cushions to withstand side loads on the plunger C12 and are fixed by means of conventional fasteners C37, C38, and C39 respectively to the plunger and cylinder.

In the driving state the plunger C12 is free to move in response to road shocks and compresses a compressible medium. The compressible medium may be a gas in the cylinder or hydraulic fluid in the cylinder connected to a suitable hydraulic accumulator. This provides a cushion for the load on the fifth wheel. Several levels of suspension stiffness for the coupling and/or wheel units can be obtained by means ofl precalibrating the accumulator(s) to different given pressures or using several accumulators. This enables them to be used in different conditions, for example, on highways and untravelled terrain.

In turning the arms C21, moved by forces derived from the fifth wheel C15, turn the steerable front wheel assemblies by means of the linkage system described hereinafter and the arms S13. The arms C21 and S13 accept mainly only the resistance of the wheels to the turn, since the thrust component of the suspension, transferred via the hydrostatic cushion does not create a substantial resistance. Effectively fluid in the cylinder is an end thrust bearing for the plunger and such fluid bearing offers little resistance to rotation of the plunger irrespective of the load.

The steering linkage system, for steering the front steerable wheels of the towed vehicle, is illustrated in FIGS. 1 and 2. As previously described the front steerable wheels are mounted by way of hydraulic assemblies S1, the piston rod being rotatable about a vertical axis and movable by way of a lever arm S13. These lever arms on one side are interconnected by a link L1 and on the other side by a link L2. The lever arms S13 of the front wheel assemblies are steered by the towing vehicle by way of linkage mechanism L connected to lever arms C21 of the coupling C1 and lever arms S13. The linkage system illustrated is hydraulic power assisted. Referring to the linkage in the upper portion of FIG. 2 a link L13 is connected at opposite ends respectively to arm C21 of the coupling C1 and a lever arm L18 by way of respective pivot pins P3 and P4. Lever arm L18 is pivotally connected by way of pivot pin P5 to a lug securely anchored on the forward end portion of the towed vehicle frame 1. A link L16 is pivotally connected respectively at opposite ends by pivots P6 and P7 to lever arm L18 and lever arm S13 of the front steerable wheel. In a complete mechanical steering system the linkage would be the same on the lower portion of FIG. 2. In the power assisted illustrated embodiment links L16 and lever arms L18 are the same as described in the foregoing, but instead of link L13 being pivotally connected to lever arm L18 it is connected by pivot pin P4 to one end of an additional lever arm L17 which in turn is pivotally connected to lever arm L18 by pivot pin P8 and the other end of lever arm L17 is connected to a link L15 by a pivot pin P9. Link L15 is connected by pivot pin P3 to the lug C21 of the coupling C1 and mounted in line with the link L15 is a hydraulic steering directional slide valve V20. The links L13 and L15 and lever arm L17 form an articulated triangle. The slide valve V20 communicates with a pressure line 21, return line 22 and power hydraulic cylinder 23 operatively connected to the linkage system. The hydraulic cylinder 23 is pivotally connected at one end to the gooseneck 7 of the towed vehicle by a pivot pin P10 and at the other end by a pivot pin P11 to the lever arm L18. The cylinder 23 is shown by way of example connected to the gooseneck 7 and lever arm L18 but obviously the cylinder 23 can be installed on the frame 1 at any convenient location and connected to other links of the assembly. Also several cylinders can be used instead of only one. Also in the drawings, the articulated triangle provided by the links is shown in the horizontal plane by way of illustration but not in a limiting sense. It is obvious that such triangle can be, for example, in an upright position in relation to the steering arms C21 and the levers S13. The links L13 and L16 are illustrated in the drawings in two different horizontal planes and thus lever arms L18 slope outwardly and upwardly from their pivotal connection to the vehicle frame. Suitable joints are provided permitting such an arrangement.

As will be seen from FIG. 2, the arms S13 and C21 radiate outwardly from the pivotal mount of the respective units and such arms diverge from each other as represented by respective lines 24 and 25.

We claim:

1. A trailer comprising:
   (a) a rigid frame supported upon a plurality of front and rear wheel ground engaging units, said front wheels being steerable;
   (b) a gooseneck extending forwardly of the frame and having on the leading end thereof coupling means for connecting to the fifth wheel of a tractor towing vehicle; and
   (c) linkage means interconnecting the fifth wheel coupling and the front steerable wheels to steer the same via rotation of said fifth wheel of the towing vehicle relative to the trailer, said linkage means comprising a first pair of links connected at one end to said fifth wheel via the coupling means and at the opposite end to a first pair of lever arms, means pivotally connecting said first pair of lever arms to the frame of the trailer and a second pair of links connecting respective ones of the first pair of lever arms and lever arms of the steerable wheel units for steering the same, at least one of the links of said first pair being connected to the first lever arm associated therewith via a third lever arm pivotally connected to such first lever arm, a third link connected at opposite ends respectively to the fifth wheel, via said coupling means, and said third lever arm, a hydraulic control slide valve arranged mechanically in series with said link for controlling fluid to a hydraulic power cylinder unit, and a hydraulic power cylinder unit connected at opposite ends respectively to the frame of the trailer and said steering linkage means and actuated by said slide valve to assist in steering the steerable wheels.

2. A trailer as defined in claim 1 wherein said fifth wheel coupling means includes cushioning means to support variable loads imposed by the fifth wheel on the gooseneck during towing.

3. A trailer as defined in claim 2 wherein said coupling means comprises a fluid pressure cylinder mounted on said gooseneck adjacent the free outer end thereof and having a plunger reciprocally mounted therein, said plunger projecting downwardly from said gooseneck and having a plate with a king pin secured thereto for coupling with the saddle of a conventional fifth wheel of a tractor towing vehicle, said cylinder and plunger acting in conjunction with a compressible medium to cushion loads between said gooseneck and the towing vehicle.

4. A trailer comprising:
(a) a rigid frame;
(b) front and rear wheel units supporting said frame, at least said front wheels being steerable;
(c) tow bar means connected to said frame and having coupling means connectable with a conventional fifth wheel of a towing vehicle; and
(d) linkage means for steering said front wheels by pivotal movement of the fifth wheel of the towing vehicle, relative to the trailer said linkage means comprising a first pair of links (L13) connected at one end thereof to the fifth wheel of the towing vehicle via said coupling means and at the other end to respective ones of a pair of lever arms, means pivotally connecting respective ones of said lever arms to said frame, second link means connecting said lever arms to arms associated with said steerable wheels to steer the same and hydraulic power means associated with said linkage means providing power assistance for steering the steerable wheels, said hydraulic power means including a hydraulic power cylinder unit connected to the trailer frame and linkage means and a slide valve mechanically arranged in series with one of said links for controlling fluid flow to said hydraulic power cylinder unit for actuating the same.

5. A trailer as defined in claim 4 wherein the tow bar is connected to the towing vehicle at a first pivot point and wherein said first pair of links are pivotally connected to the towing vehicle at respective second and third pivot points located respectively on opposite sides of said first pivot point.

6. An improved linkage system for steering steerable wheels of a trailer via forces derived from the fifth wheel coupling of a towing vehicle towing the trailer that result from rotation of said fifth wheel of the towing vehicle relative to the trailer, said linkage system comprising pivotally interconnected first, second and third arms in a triangular arrangement connected at the apex thereof to the fifth wheel, said third arm, defining the base of the triangle, being connected to arm means for steering the steerable wheels, a hydraulic slide valve arranged mechanically in series with one of said first and second arms and controlling fluid flow to a hydraulic power cylinder unit connected to the arm means to assist in steering the steerable wheels.

* * * * *